United States Patent
Li et al.

(10) Patent No.: US 10,820,351 B2
(45) Date of Patent: Oct. 27, 2020

(54) RANDOM ACCESS METHOD AND APPARATUS

(71) Applicant: Huawei Technologies Co., Ltd., Shenzhen (CN)

(72) Inventors: Guorong Li, Shenzhen (CN); Lili Zhang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/767,265

(22) PCT Filed: Jan. 18, 2016

(86) PCT No.: PCT/CN2016/071206
§ 371 (c)(1),
(2) Date: Apr. 10, 2018

(87) PCT Pub. No.: WO2017/124226
PCT Pub. Date: Jul. 27, 2017

(65) Prior Publication Data
US 2019/0059109 A1    Feb. 21, 2019

(51) Int. Cl.
*H04W 74/08* (2009.01)
*H04W 48/20* (2009.01)
(Continued)

(52) U.S. Cl.
CPC ....... *H04W 74/0833* (2013.01); *H04W 48/20* (2013.01); *H04W 16/32* (2013.01);
(Continued)

(58) Field of Classification Search
CPC . H04W 74/0833; H04W 48/20; H04W 16/32; H04W 48/10; H04W 74/002; H04W 88/08
See application file for complete search history.

(56) References Cited

U.S. PATENT DOCUMENTS 6,418,317 B1* 7/2002 Cuffaro ................. H04W 16/10
                                                                  455/450
9,143,288 B2* 9/2015 Malladi ................. H04L 5/0007
(Continued)

FOREIGN PATENT DOCUMENTS

CN    101772028 A    7/2010
CN    103841588 A    6/2014
(Continued)

OTHER PUBLICATIONS

Foreign Communication From a Counterpart Application, European Application No. 16885499.0, Extended European Search Report dated Oct. 9, 2018, 8 pages.
(Continued)

*Primary Examiner* — Christopher M Crutchfield
*Assistant Examiner* — Tito Q Pham
(74) *Attorney, Agent, or Firm* — Conley Rose, P.C.

(57) ABSTRACT

A random access method and apparatus are provided. The random access method includes receiving, by a terminal, virtual cell information at a virtual frequency, where the virtual cell information includes information about at least one physical cell indicated by the virtual cell; determining, by the terminal according to the information about the at least one physical cell, a target physical cell to be pre-accessed; and accessing, by the terminal, the target physical cell using information about the target physical cell. According to embodiments of the present disclosure, information about a physical cell can be received and transmitted at a virtual frequency, such that an idle virtual frequency resource is fully utilized, and a latency is reduced.

20 Claims, 8 Drawing Sheets

(51) Int. Cl.
*H04W 74/00* (2009.01)
*H04W 16/32* (2009.01)
*H04W 48/10* (2009.01)
*H04W 88/08* (2009.01)

(52) U.S. Cl.
CPC .......... *H04W 48/10* (2013.01); *H04W 74/002* (2013.01); *H04W 88/08* (2013.01)

(56) References Cited

U.S. PATENT DOCUMENTS

| | | | |
|---|---|---|---|
| 2011/0164593 A1* | 7/2011 | Huet ................. | H04W 36/0055 370/333 |
| 2011/0287777 A1 | 11/2011 | Yu | |
| 2013/0315195 A1* | 11/2013 | Ko ...................... | H04W 72/082 370/329 |
| 2014/0029531 A1 | 1/2014 | Chang et al. | |
| 2015/0215839 A1 | 7/2015 | Johansson et al. | |
| 2015/0264677 A1* | 9/2015 | He ........................ | H04W 72/02 370/312 |
| 2015/0289186 A1 | 10/2015 | Stålnacke et al. | |
| 2015/0373626 A1* | 12/2015 | Yi ........................ | H04W 48/20 375/132 |
| 2016/0323784 A1* | 11/2016 | Ma ........................ | H04W 76/10 |
| 2018/0288681 A1* | 10/2018 | Paredes Cabrera ... | H04W 48/18 |

FOREIGN PATENT DOCUMENTS

| | | |
|---|---|---|
| CN | 105027626 A | 11/2015 |
| WO | 2014198295 A1 | 12/2014 |
| WO | 2015069026 A1 | 5/2015 |

OTHER PUBLICATIONS

Machine Translation and Abstract of Chinese Publication No. CN103841588, Jun. 4, 2014, 22 pages.
"3rd Generation Partnership Project; Technical Specification Group Radio Access Network; Evolved Universal Terrestrial Radio Access (E-UTRA); User Equipment (UE) procedures in idle mode(Release 13)," 3GPP TS 36.304, V13.0.0, Dec. 2015, 42 pages.
"3rd Generation Partnership Project; Technical Specification Group Radio Access Network; Evolved Universal Terrestrial Radio Access (E-UTRA); Medium Access Control (MAC) protocol specification (Release 13)," 3GPP TS 36.321, V13.0.0, Dec. 2015, 82 pages.
"3rd Generation Partnership Project; Technical Specification Group Radio Access Network; Evolved Universal Terrestrial Radio Access (E-UTRA); Radio Resource Control (RRC); Protocol specification (Release 13)," 3GPP TS 36.331, V13.0.0, Dec. 2015, 507 pages.
Foreign Communication From a Counterpart Application, PCT Application No. PCT/CN2016/071206, English Translation of International Search Report dated Oct. 9, 2016, 2 pages.
Machine Translation and Abstract of Chinese Publication No. CN105027626, Nov. 4, 2015, 35 pages.
Foreign Communication From a Counterpart Application, Chinese Application No. 201680067308.5, Chinese Office Action dated Mar. 29, 2019, 6 pages.
Foreign Communication From a Counterpart Application, European Application No. 16885499.0, European Office Action dated Dec. 16, 2019, 6 pages.

* cited by examiner

RANDOM ACCESS METHOD AND APPARATUS

CROSS-REFERENCE TO RELATED APPLICATIONS

This application is a national stage of International Application No. PCT/CN2016/071206, filed on Jan. 18, 2016, which is hereby incorporated by reference in its entirety.

TECHNICAL FIELD

The present disclosure relates to the field of mobile communications technologies, and in particular, to a random access method and apparatus.

BACKGROUND

In an ultra dense network (UDN) system, with an increase in cell density on a network, user mobility management in the UDN becomes extremely severe. The following problems need to be urgently resolved: how to prevent a user in an idle state from performing cell selection and cell reselection frequently in the UDN, and how to prevent a user in a connected state from frequent handover in the UDN. A virtual layer technology can effectively control a channel interference problem and a mobility problem.

China Telecom points out that a basic principle of the virtual layer technology is that a single-layer physical network forms a virtual multi-layer network. As shown in FIG. 1, multiple physical cells form a two-layer network: a virtual macrocell and a physical microcell. When a physical cell that forms a virtual cell uses a single carrier, micro base stations in the UDN can be divided into several clusters, and each cluster may form a virtual layer. A virtual physical cell identity (VPCI) is configured for each cluster on the network. Micro base stations in a same cluster simultaneously send a virtual layer reference signal (VRS), and different clusters send different VRSs. The micro base stations in a same cluster simultaneously send broadcast information, paging information, a random access response, and common control signaling, and perform scrambling using a VPCI. A conventional physical cell forms a physical layer, and a physical cell identity (PCI) is configured for each physical cell on the network.

A user in an idle state camps at a virtual layer, and listens to information, including a VRS, broadcast information, paging information, and common control signaling, sent by a microcell cluster, and performs descrambling on the broadcast information, the paging information, and the common control signaling using a VPCI. The user in an idle state does not need to identify a physical layer, and does not perform cell reselection when the user in an idle state moves in a same cluster. However, when a terminal randomly accesses a physical cell, in a solution still used in the prior art, the terminal obtains system information of the physical cell from the physical cell, and sends, according to the system information of the physical cell, a random access request to a micro base station that serves the physical cell, so as to perform access. Some latencies are caused in obtaining the information of the physical cell. In addition, data transmission is performed in the physical cell, and resources are relatively strained.

SUMMARY

Embodiments of the present disclosure provide a random access method and apparatus. Information about a physical cell is received and transmitted at a virtual frequency, such that an idle virtual frequency resource is fully utilized, and a latency is reduced.

A first aspect of the present disclosure provides a random access method, including receiving, by a terminal, virtual cell information at a virtual frequency, where the virtual cell information includes information about at least one physical cell indicated by the virtual cell; determining, by the terminal according to the information about the at least one physical cell, a target physical cell to be pre-accessed; and accessing, by the terminal, the target physical cell using information about the target physical cell.

Based on the first aspect, in a first feasible implementation of the first aspect, the virtual cell information is virtual cell system information, the at least one physical cell includes all physical cells in coverage of the virtual cell, and the information about the physical cell includes random access information of the physical cell, or includes capability information and random access information of the physical cell; and the capability information includes one or more of the following information: load information, a multiconnection capability, a multiple-input multiple-output (MIMO) capability, multimedia broadcast multicast service (MBMS) service support, minimization of drive tests support (MDT), a device-to-device (D2D) capability, a new carrier type, or extended carrier support of the physical cell.

Based on the first feasible implementation of the first aspect, in a second feasible implementation of the first aspect, if the information about the physical cell includes the capability information and the random access information of the physical cell, before the determining, by the terminal according to the information about the at least one physical cell, a target physical cell to be pre-accessed, the method further includes searching, by the terminal, for at least one candidate physical cell in which the terminal is currently located; the determining, by the terminal according to the information about the at least one physical cell, a target physical cell to be pre-accessed includes obtaining, by the terminal, capability information of each of the at least one candidate physical cell from the virtual cell system information, and selecting, by the terminal according to the capability information of each candidate physical cell, a physical cell that matches a capability or a service characteristic of the terminal; and determining the physical cell that matches the capability or the service characteristic of the terminal as the target physical cell to be pre-accessed; and the accessing, by the terminal, the target physical cell using information about the target physical cell includes reading, by the terminal, random access information of the target physical cell from the virtual cell system information, and accessing the target physical cell using the random access information of the target physical cell.

Based on the first feasible implementation of the first aspect or the second feasible implementation of the first aspect, in a third feasible implementation of the first aspect, the virtual cell system information is sent over a physical broadcast channel (PBCH) and a bearer broadcast channel (BCH) of the virtual cell.

Based on the first aspect, in a fourth feasible implementation of the first aspect, before the receiving, by a terminal, virtual cell information at a virtual frequency, the method further includes sending, by the terminal, a random access request to the virtual cell at the virtual frequency, so as to trigger the virtual cell to indicate, according to the random access request, information about a physical cell to the terminal using the virtual cell information, where the information about the physical cell is frequency information of the physical cell, and the frequency information of the physical cell includes an uplink (UL) frequency and a downlink (DL) frequency of the physical cell; the determining, by the terminal according to the information about the at least one physical cell, a target physical cell to be pre-accessed includes determining, by the terminal, the physical cell indicated in the virtual cell information as the target physical cell to be pre-accessed; and the accessing, by the terminal, the target physical cell using information about the target physical cell includes accessing, by the terminal, the target physical cell using the frequency information of the physical cell in the virtual cell information.

Based on the fourth feasible implementation of the first aspect, in a fifth feasible implementation of the first aspect, the physical cell in the virtual cell information is a physical cell corresponding to a micro base station, satisfying a preset criterion, selected from at least one micro base station that receives the random access request; and the preset criterion includes that received signal quality satisfies a preset threshold; and if received signal quality of multiple micro base stations satisfies the preset threshold, a micro base station that has minimum load is selected.

A second aspect of the present disclosure provides a random access apparatus, including a receiving module configured to receive virtual cell information at a virtual frequency, where the virtual cell information includes information about at least one physical cell indicated by the virtual cell; a determining module configured to determine, according to the information about the at least one physical cell, a target physical cell to be pre-accessed; and an access module configured to access the target physical cell using information about the target physical cell.

Based on the second aspect, in a first feasible implementation of the second aspect, the virtual cell information is virtual cell system information, the at least one physical cell includes all physical cells in coverage of the virtual cell, and the information about the physical cell includes random access information of the physical cell, or includes capability information and random access information of the physical cell; and the capability information includes one or more of the following information: load information, a multiconnection capability, a MIMO capability, MBMS service support, MDT, a D2D capability, a new carrier type, or extended carrier support of the physical cell.

Based on the first feasible implementation of the second aspect, in a second feasible implementation of the second aspect, if the information about the physical cell includes the capability information and the random access information of the physical cell, the apparatus further includes a searching module configured to search for at least one candidate physical cell in which the terminal is currently located; the determining module includes an obtaining unit and a determining unit, where the obtaining unit is configured to obtain capability information of each of the at least one candidate physical cell from the virtual cell system information, and the determining unit is configured to select, according to the capability information of each candidate physical cell, a physical cell that matches a capability or a service characteristic of the terminal, and determine the physical cell that matches the capability or the service characteristic of the terminal as the target physical cell to be pre-accessed; and the access module is configured to read random access information of the target physical cell from the virtual cell system information, and access the target physical cell using the random access information of the target physical cell.

Based on the first feasible implementation of the second aspect or the second feasible implementation of the second aspect, in a third feasible implementation of the second aspect, the virtual cell system information is sent over a PBCH and a BCH of the virtual cell.

Based on the second aspect, in a fourth feasible implementation of the second aspect, the apparatus further includes a sending module configured to send a random access request to the virtual cell at the virtual frequency, so as to trigger the virtual cell to indicate, according to the random access request, information about a physical cell to the terminal using the virtual cell information, where the information about the physical cell is frequency information of the physical cell, and the frequency information of the physical cell includes an UL frequency and a DL frequency of the physical cell; the determining module is configured to determine the physical cell indicated in the virtual cell information as the target physical cell to be pre-accessed; and the access module is configured to access the target physical cell using the frequency information of the physical cell in the virtual cell information.

Based on the fourth feasible implementation of the second aspect, in a fifth feasible implementation of the second aspect, the physical cell in the virtual cell information is a physical cell corresponding to a micro base station, satisfying a preset criterion, selected from at least one micro base station that receives the random access request; and the preset criterion includes that received signal quality satisfies a preset threshold; and if received signal quality of multiple micro base stations satisfies the preset threshold, a micro base station that has minimum load is selected.

In the embodiments of the present disclosure, the terminal receives the virtual cell information at the virtual frequency, where the virtual cell information includes the information about the at least one physical cell indicated by the virtual cell; the terminal determines, according to the information about the at least one physical cell, the target physical cell to be pre-accessed; and the terminal accesses the target physical cell using the information about the target physical cell. According to this manner, information about a physical cell is received and transmitted at the virtual frequency, such that an idle virtual frequency resource is fully utilized, and a latency for the terminal to access the target physical cell is reduced.

BRIEF DESCRIPTION OF DRAWINGS

To describe the technical solutions in the embodiments of the present disclosure or in the prior art more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 2:
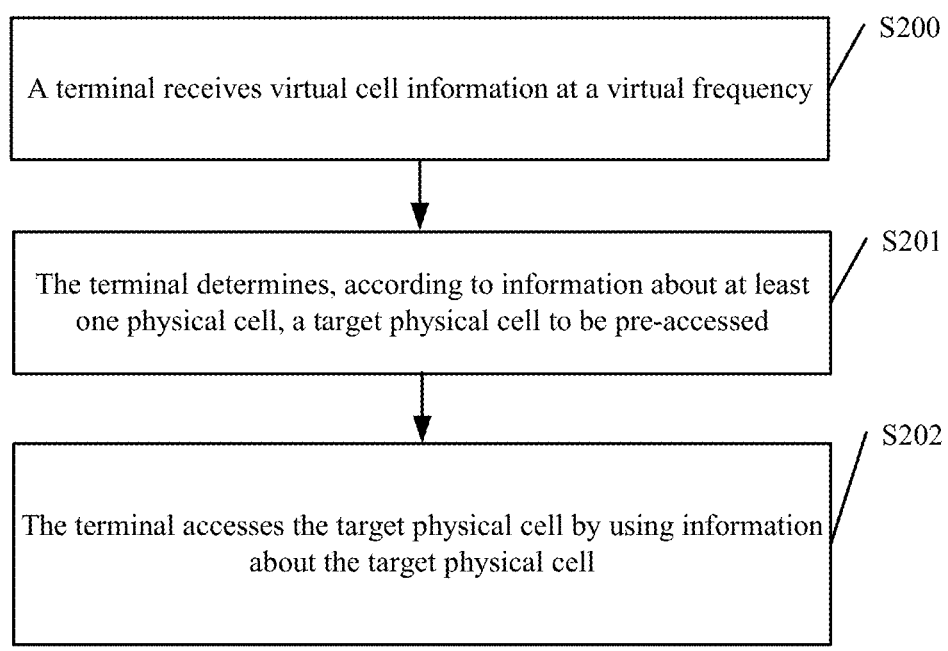
FIG. 2 is a schematic flowchart of a random access method according to an embodiment of the present disclosure.

Referring to FIG. 2, FIG. 2 is a schematic flowchart of a random access method according to an embodiment of the present disclosure. As shown in the figure, the random access method in this embodiment includes the following steps.

S200. A terminal receives virtual cell information at a virtual frequency, where the virtual cell information includes information about at least one physical cell indicated by the virtual cell.

Figure 1:
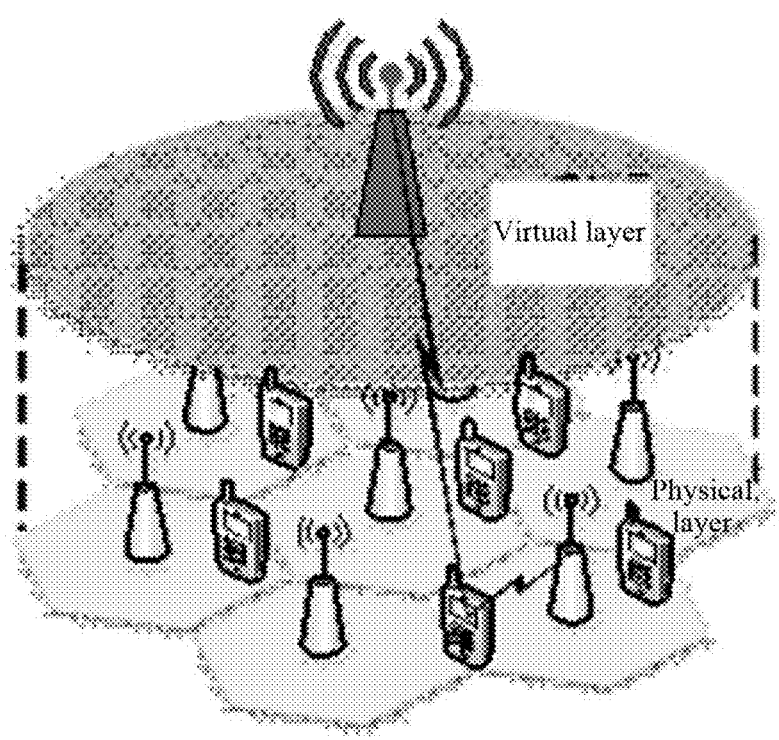
FIG. 1 is an architectural diagram of a virtual cell according to an embodiment of the present disclosure.

In a specific embodiment, the random access method provided in this embodiment of the present disclosure is to mainly resolve a random access problem in a scenario in which a physical cell forms a virtual cell. As shown in FIG. 1, FIG. 1 is an architectural diagram of a system to which the random access method in the present disclosure is applied. As shown in the figure, a single-layer physical network forms a multi-layer virtual network. As shown in the following figure, a single-layer physical cell forms a two-layer network: a virtual macrocell and a physical microcell. The virtual macrocell carries control signaling, and is responsible for mobility management. Data transmission is performed in the physical microcell.

In this embodiment of the present disclosure, a virtual cell may have two types of architectures. A first architecture is: There is a main transmit point in the virtual cell, the transmit point is used as a Radio Resource Control protocol (RRC) link maintenance point, and the RRC link maintenance point may receive and transmit control signaling for a virtual layer. It should be noted that, the terminal user equipment (UE) receives and transmits data from/to the RRC link maintenance point at a virtual frequency. A second architecture is: All physical cells are flat, and control signaling received and transmitted at a virtual layer is transmitted, at a virtual frequency, by any one or more of micro base stations that serve all the physical cells. It should be noted that, a micro base station that serves each physical cell may receive and transmit information at a virtual frequency or a physical frequency. Generally, information received and transmitted at a virtual frequency is control signaling, and information received and transmitted at a physical frequency is exchanged data. The virtual cell information in this embodiment of the present disclosure is control signaling, and therefore, is received and transmitted at the virtual frequency.

Generally, a user terminal in an idle state camps at a virtual layer. When the terminal needs to access a physical cell, the terminal receives virtual cell information at a virtual frequency. The virtual cell information includes information about at least one physical cell indicated by a virtual cell. Optionally, the virtual cell information may be virtual cell system information (VSI). Information about a physical cell in the virtual cell information may be system information (SI) of each physical cell. Further, optionally, the SI may include random access information of the physical cell and capability information used to indicate various capability services supported by the physical cell. Optionally, the virtual cell information may be frequency information of a physical cell selected by the virtual cell according to received signal quality of all physical cells. The frequency information may include an UL frequency and a DL frequency.

S201. The terminal determines, according to the information about the at least one physical cell, a target physical cell to be pre-accessed.

In a specific embodiment, the terminal determines, according to the information about the at least one physical cell indicated in the virtual cell information, the target physical cell to be pre-accessed. Generally, if the virtual cell information includes information about multiple physical cells, the terminal needs to perform selection according to the information about the physical cells and a capability or a service of the terminal, and finally selects a most appropriate target physical cell.

For example, in a scenario of inter-frequency physical cells (that is, multiple carrier frequencies are allocated to independent physical cells), multi-carrier load balancing (or smart offloading) is a factor that needs to be considered. In the scenario of inter-frequency physical cells, when carrier load of each physical cell is considered, the UE camps on a physical cell that is most appropriate to a capability or a service of the UE, so as to meet a requirement of the UE. For example, if the UE expects to perform a dual connectivity operation, but a carrier of a physical cell cannot cooperate with another carrier to implement dual connectivity of the UE, the UE needs to switch to another carrier that supports dual connectivity, to perform a dual connectivity operation. This leads to unnecessary switch signaling and an unnecessary latency. Therefore, in this embodiment, when the UE performs random access, a load status of each physical cell is considered, such that the UE camps on a most appropriate target physical cell. For another example, the UE has a greater MIMO capability, and if a carrier cannot support the MIMO capability, connectivity of the UE cannot be implemented using this carrier.

Optionally, if the virtual cell information includes information about a physical cell indicated by a virtual cell, and the physical cell is a physical cell determined by the virtual cell according to load and/or received signal quality of all physical cells, the terminal may directly determine the physical cell as the target physical cell to be pre-accessed. Further, optionally, the information about the physical cell in the virtual cell information is an UL frequency and a DL frequency of the physical cell.

S202. The terminal accesses the target physical cell using information about the target physical cell.

In a specific embodiment, after determining the target physical cell to be pre-accessed, the terminal accesses the target physical cell using information about the target physical cell in the virtual cell information. A specific access method may include sending a random access request to a micro base station that serves the physical cell; and returning, by the micro base station, a random access response after receiving the random access request, and further establishing a radio control link.

In this embodiment of the present disclosure, the terminal receives the virtual cell information at the virtual frequency, where the virtual cell information includes the information about the at least one physical cell indicated by the virtual cell; the terminal determines, according to the information about the at least one physical cell, the target physical cell to be pre-accessed; and the terminal accesses the target physical cell using the information about the target physical cell. According to this manner, information about a physical cell is received and transmitted at the virtual frequency, such that an idle virtual frequency resource is fully utilized, and a latency for the terminal to access the target physical cell is reduced.

Figure 3:
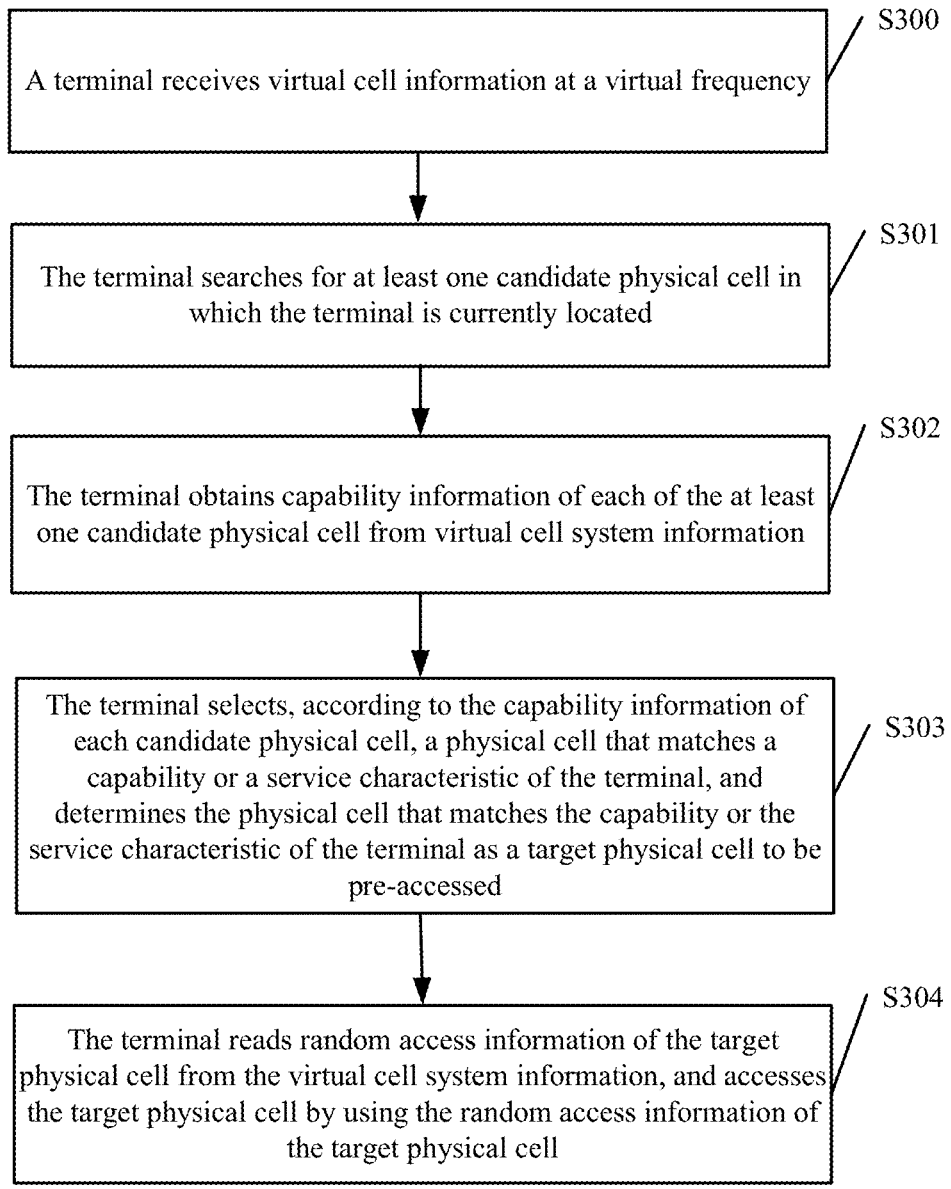
FIG. 3 is a schematic flowchart of another random access method according to an embodiment of the present disclosure.

Referring to FIG. 3, FIG. 3 is a schematic flowchart of another random access method according to an embodiment of the present disclosure. As shown in the figure, the random access method in this embodiment includes the following steps.

S300. A terminal receives virtual cell information at a virtual frequency, where the virtual cell information includes information about at least one physical cell indicated by the virtual cell.

The virtual cell information is virtual cell system information, the at least one physical cell includes all physical cells in coverage of the virtual cell, and the information about the physical cell includes random access information of the physical cell, or includes capability information and random access information of the physical cell.

The capability information includes one or more of the following information: load information, a multiconnection capability, a MIMO capability, MBMS service support, MDT, a D2D capability, a new carrier type, or extended carrier support of the physical cell.

In a specific embodiment, the VSI includes SI of all physical cells in coverage of the virtual cell. To reduce signaling overheads of broadcasting SI of a physical cell using the VSI, generally, only random access-related SI (for example, random access information) of the physical cell is broadcast, and compressing and grouping operations may be performed on the information to further reduce overheads. The virtual frequency of the virtual cell is not involved in data transfer, and therefore, there are relatively sufficient resources to transfer control signaling, such as virtual cell system information VSI, of another cell.

Further, optionally, to perform offloading among multiple physical cells and further match a capability/service characteristic of the UE, other information (such as, capability information) of the physical cells may also be broadcast in the VSI, such that the UE determines a target physical cell that the UE should access.

Optionally, the VSI of the virtual cell includes a master information block (MIB) and a system information block (SIB). The VSI may be sent over a BCH and a PBCH of the virtual cell. The UE obtains the VSI using the BCH and the PBCH. Generally, a period of the VSI may be longer, because the VSI is used only to reduce cell reselection overheads for the UE, and changes less frequently than physical cell SI does. In addition, the VSI includes the virtual cell information, common channel configuration, neighboring virtual cell information, and physical cell information, and may include more content. Therefore, the sending period of the VSI is relatively long. A BCH/PBCH period of the virtual cell may be longer than an existing period in LTE. This embodiment is different from a case in which a SIB is transmitted over a physical DL shared channel (PDSCH) in a conventional system.

S301. The terminal searches for at least one candidate physical cell in which the terminal is currently located.

In a specific embodiment, when the UE needs to perform random access, the UE searches for at least one candidate physical cell in which the UE is currently located. That is, the UE is located in an overlap area of at least one candidate physical cell. It should be noted that, when the terminal UE finds a candidate physical cell, no matter physical cells are inter-frequency or intra-frequency physical cells, the UE may obtain a DL frequency of the candidate physical cell.

S302. The terminal obtains capability information of each of the at least one candidate physical cell from the virtual cell system information.

In a specific embodiment, the UE obtains the capability information of each of the at least one candidate physical cell from the VSI. The capability information can indicate a capability supported by the physical cell, such that the terminal UE may select, according to the capability information of each candidate physical cell, a target physical cell that best matches a capability or a service of the UE.

S303. The terminal selects, according to the capability information of each candidate physical cell, a physical cell that matches a capability or a service characteristic of the terminal, and determines the physical cell that matches the capability or the service characteristic of the terminal as a target physical cell to be pre-accessed.

In a specific embodiment, a UE side further selects, according to the capability information of each candidate physical cell, a carrier and a physical cell that matches the capability or the service characteristic of the terminal UE, such as a multi-connection/MBMS/MDT/MIMO/D2D capability, a UE level, and a UE receiver capability. The terminal UE determines the physical cell that matches the capability or the service characteristic of the terminal as the target physical cell to be pre-accessed. After selecting an appropriate carrier and the target physical cell, the UE completes a random access procedure in the target physical cell. Further, optionally, after selecting the physical cell that matches the capability or the service characteristic of the terminal UE, the terminal UE may further select a physical cell with minimum load by reference to load information of each physical cell.

S304. The terminal reads random access information of the target physical cell from the virtual cell system information, and accesses the target physical cell using the random access information of the target physical cell.

In a specific embodiment, the VSI includes SI of each physical cell, and the SI carries random access information of the physical cell. The UE reads, from the VSI, the random access information carried in SI of the target physical cell, and accesses the target physical cell using the random access information.

Optionally, the terminal may obtain SI (random access information) of the candidate physical cell from the physical cell, and accesses the physical cell using the random access information.

In this embodiment of the present disclosure, the terminal receives the virtual cell information at the virtual frequency, where the virtual cell information includes the information about the at least one physical cell indicated by the virtual cell; the terminal determines, according to the information about the at least one physical cell, the target physical cell to be pre-accessed; and the terminal accesses the target physical cell using the information about the target physical cell. According to this manner, information about a physical cell is received and transmitted at the virtual frequency, such that an idle virtual frequency resource is fully utilized, and a latency for the terminal to access the target physical cell is reduced.

Figure 4:
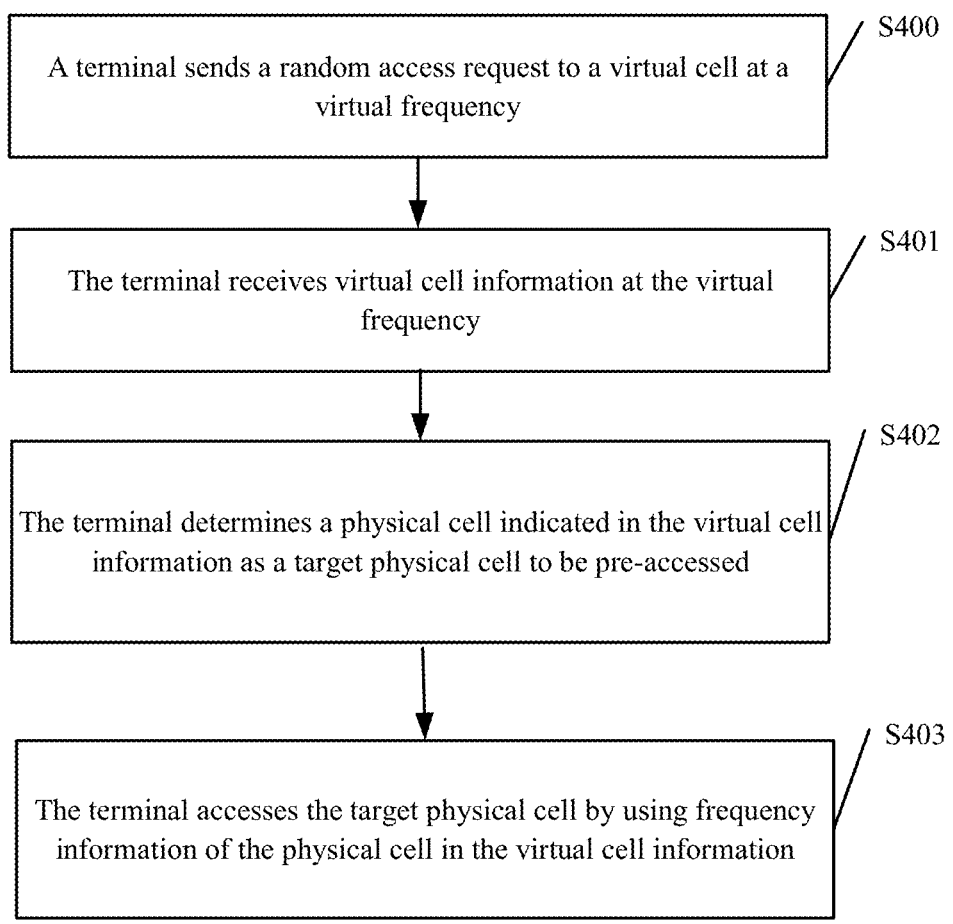
FIG. 4 is a schematic flowchart of still another random access method according to an embodiment of the present disclosure.

Referring to FIG. 4, FIG. 4 is a schematic flowchart of still another random access method according to an embodiment of the present disclosure. As shown in the figure, the random access method in this embodiment includes the following steps.

S400. A terminal sends a random access request to a virtual cell at a virtual frequency, so as to trigger the virtual cell to indicate, according to the random access request, information about a physical cell to the terminal using the virtual cell information, where the information about the physical cell is frequency information of the physical cell, and the frequency information of the physical cell includes an UL frequency and a DL frequency of the physical cell.

In a specific embodiment, when UE needs to randomly access a physical cell, the UE sends a random access request to a virtual cell at a virtual frequency. The virtual cell selects, according to the random access request, a physical cell corresponding to a micro base station, satisfying a preset criterion, selected from at least one micro base station that receives the random access request. Optionally, the preset criterion includes that received signal quality satisfies a preset threshold; and if received signal quality of multiple micro base stations satisfies the preset threshold, a micro base station that has minimum load is selected. It should be noted that, if a system architecture includes a main transmit point, selection is performed by the main transmit point. If all physical cells are flat, the physical cell is selected and determined according to exchanged information of each base station. Information about the physical cell includes frequency information of the physical cell, and the frequency information includes an UL frequency and a DL frequency.

It should be noted that, if the virtual cell information does not indicate the frequency information of the physical cell, the UE determines that the physical cell has a same UL frequency and a same DL frequency as the virtual cell.

S401. The terminal receives the virtual cell information at the virtual frequency, where the virtual cell information includes information about at least one physical cell indicated by the virtual cell.

S402. The terminal determines a physical cell indicated in the virtual cell information as a target physical cell to be pre-accessed.

In a specific embodiment, the UE receives the virtual cell information (which is carried in a random access response fed back by a base station based on a random access request), determines a physical cell indicated in the virtual cell information as a target physical cell to be pre-accessed, and determines frequency information of the physical cell in the virtual cell information as an UL frequency and a DL frequency of the target physical cell.

S403. The terminal accesses the target physical cell using frequency information of the physical cell in the virtual cell information.

In a specific embodiment, the UE sends the random access request at the UL frequency of the physical cell indicated in the virtual cell information, and receives the random access response at the DL frequency of the indicated physical cell, so as to access the target physical cell.

In this embodiment of the present disclosure, the terminal receives the virtual cell information at the virtual frequency, where the virtual cell information includes the information about the at least one physical cell indicated by the virtual cell; the terminal determines, according to the information about the at least one physical cell, the target physical cell to be pre-accessed; and the terminal accesses the target physical cell using the information about the target physical cell. According to this manner, information about a physical cell is received and transmitted at the virtual frequency, such that an idle virtual frequency resource is fully utilized, and a latency for the terminal to access the target physical cell is reduced.

Figure 5:
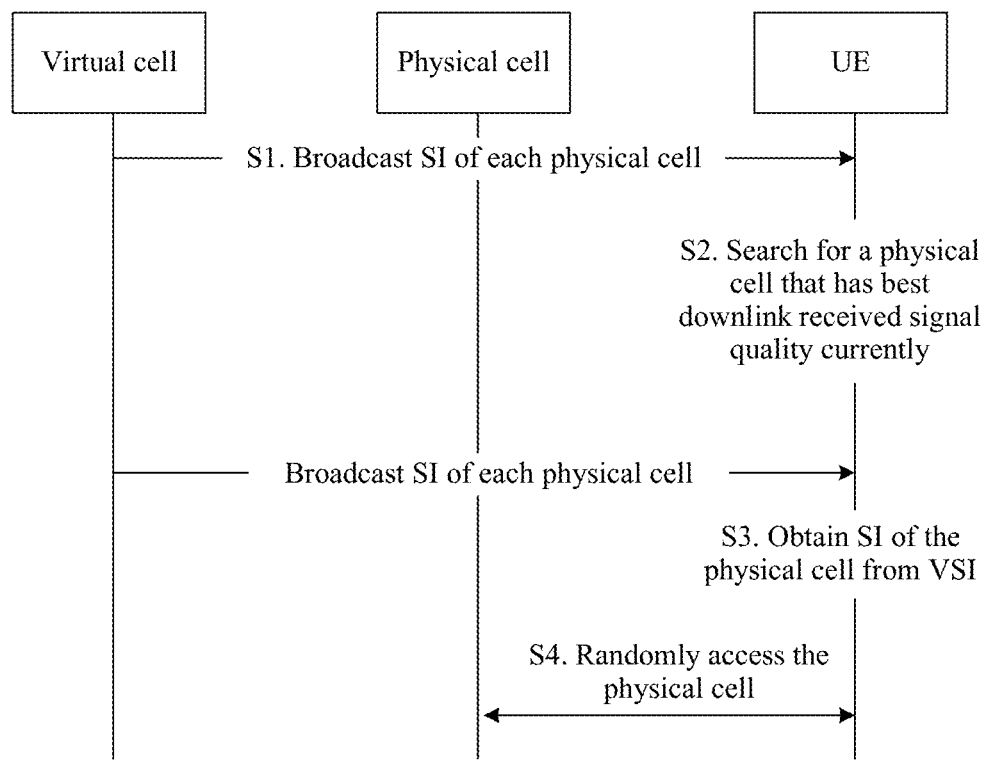
FIG. 5 is a diagram of terminal interaction according to an embodiment of the present disclosure.

Referring to FIG. 5, FIG. 5 is a diagram of terminal interaction according to an embodiment of the present disclosure. As shown in the figure, a system architecture includes a virtual cell, a physical cell in coverage of the virtual cell, and UE.

S1. The virtual cell broadcasts VSI, where the VSI includes SI of each physical cell.

S2. The UE searches for a physical cell that has best DL received signal quality currently.

S3. The UE obtains SI of the physical cell from the received VSI.

S4. The UE accesses the physical cell using the obtained SI of the physical cell.

Figure 6:
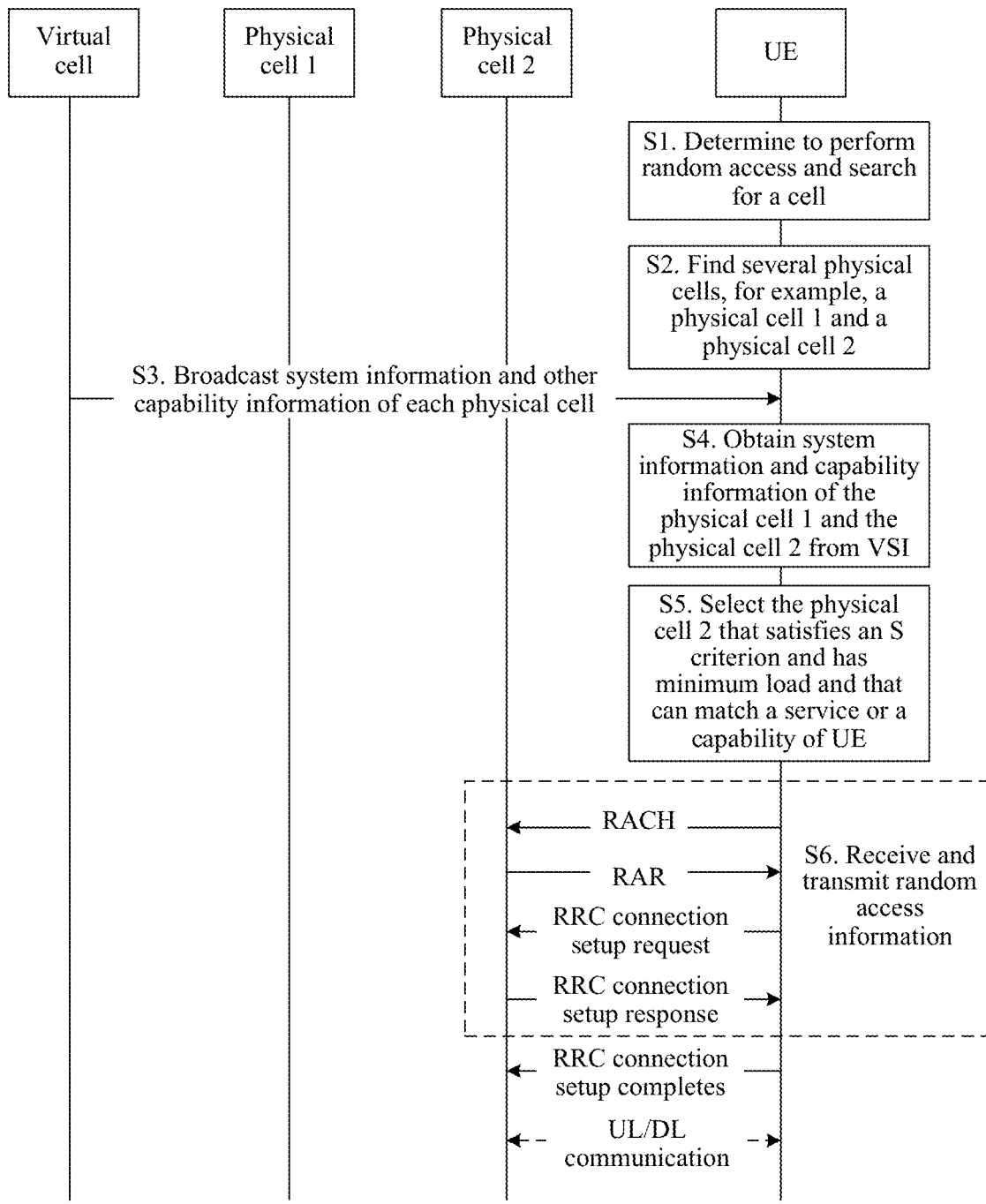
FIG. 6 is another diagram of terminal interaction according to an embodiment of the present disclosure.

Referring to FIG. 6, FIG. 6 is another diagram of terminal interaction according to an embodiment of the present disclosure. As shown in the figure, a system architecture includes a virtual cell, a physical cell 1 and a physical cell 2 in coverage of the virtual cell, and UE.

S1. The UE determines to randomly access a physical cell, and searches for a cell.

S2. The UE finds several physical cells, for example, the physical cell 1 and the physical cell 2.

S3. The virtual cell broadcasts VSI, where the VSI includes system information and other capability information of each physical cell.

S4. The UE obtains system information and capability information of the physical cell 1 and the physical cell 2 from the VSI.

S5. The UE compares the capability information of the physical cell 1 with the capability information of the physical cell 2, and selects the physical cell 2 that satisfies a criterion of the UE and has minimum load and that can match a service and a capability of the UE.

S6. The UE receives and transmits random access information from/to the physical cell 2, so as to access the physical cell 2.

Figure 7:
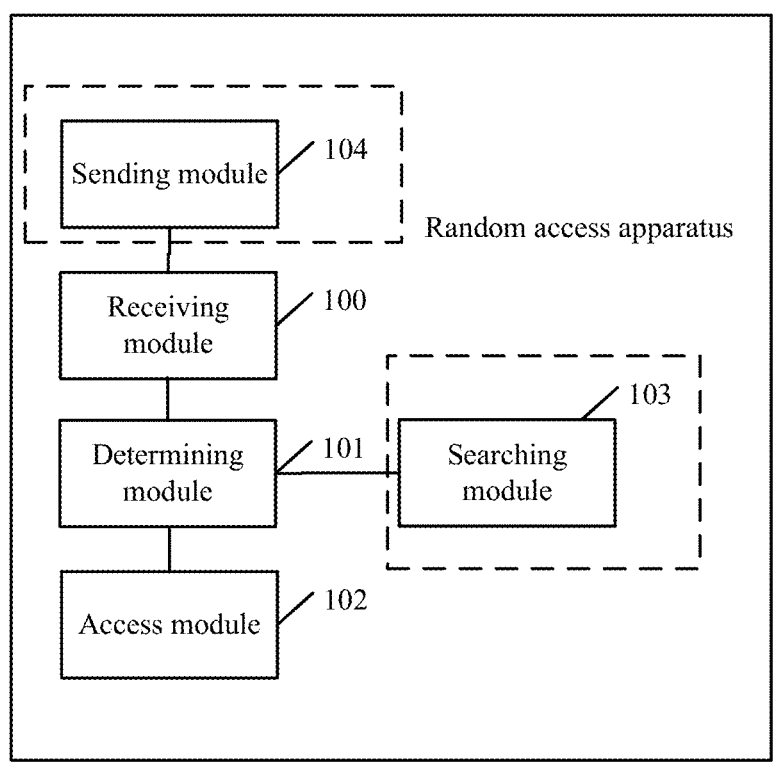
FIG. 7 is a schematic structural diagram of a random access apparatus according to an embodiment of the present disclosure.

Referring to FIG. 7, FIG. 7 is a schematic structural diagram of a random access apparatus according to an embodiment of the present disclosure. As shown in the figure, the random access apparatus in this embodiment includes a receiving module 100, a determining module 101, and an access module 102.

The receiving module 100 is configured to receive virtual cell information at a virtual frequency, where the virtual cell information includes information about at least one physical cell indicated by the virtual cell.

Optionally, the virtual cell information may be VSI. Information about a physical cell in the virtual cell information may be SI of each physical cell. Further, optionally, the SI may include random access information of the physical cell and capability information used to indicate various capability services supported by the physical cell.

Optionally, the virtual cell information may be frequency information of a physical cell selected by the virtual cell according to received signal quality of all physical cells. The frequency information may include an UL frequency and a DL frequency.

The determining module 101 is configured to determine, according to the information about the at least one physical cell, a target physical cell to be pre-accessed.

Generally, if the virtual cell information includes information about multiple physical cells, the terminal needs to perform selection according to the information about the physical cells and a capability or a service of the terminal, and finally selects a most appropriate target physical cell.

Optionally, if the virtual cell information includes information about a physical cell indicated by a virtual cell, and the physical cell is a physical cell determined by the virtual cell according to load and/or received signal quality of all physical cells, the terminal may directly determine the physical cell as the target physical cell to be pre-accessed. Further, optionally, the information about the physical cell in the virtual cell information is an UL frequency and a DL frequency of the physical cell.

The access module 102 is configured to access the target physical cell using information about the target physical cell.

Optionally, the virtual cell information is virtual cell system information, the at least one physical cell includes all physical cells in coverage of the virtual cell, and the information about the physical cell includes random access information of the physical cell, or includes capability information and random access information of the physical cell.

The capability information includes one or more of the following information: load information, a multiconnection capability, a MIMO capability, MBMS service support, MDT, a D2D capability, a new carrier type, or extended carrier support of the physical cell.

As shown in FIG. 7, the apparatus may further include a searching module 103.

The searching module 103 is configured to search for at least one candidate physical cell in which the terminal is currently located.

The determining module 101 includes an obtaining unit and a determining unit.

The obtaining unit is configured to obtain capability information of each of the at least one candidate physical cell from the virtual cell system information.

The determining unit is configured to select, according to the capability information of each candidate physical cell, a physical cell that matches a capability or a service characteristic of the terminal, and determine the physical cell that matches the capability or the service characteristic of the terminal as the target physical cell to be pre-accessed.

The access module 102 is configured to read random access information of the target physical cell from the virtual cell system information, and access the target physical cell using the random access information of the target physical cell.

Further, optionally, as shown in FIG. 7, the apparatus may include a sending module 104.

The sending module 104 is configured to send a random access request to the virtual cell at the virtual frequency, so as to trigger the virtual cell to indicate, according to the random access request, information about a physical cell to the terminal using the virtual cell information. The information about the physical cell is frequency information of the physical cell, and the frequency information of the physical cell includes an UL frequency and a DL frequency of the physical cell.

Optionally, the virtual cell may select, according to the random access request, a physical cell corresponding to a micro base station, satisfying a preset criterion, selected from at least one micro base station that receives the random access request. Optionally, the preset criterion includes that received signal quality satisfies a preset threshold; and if received signal quality of multiple micro base stations satisfies the preset threshold, a micro base station that has minimum load is selected.

The determining module 101 is configured to determine the physical cell indicated in the virtual cell information as the target physical cell to be pre-accessed.

The access module 102 is configured to access the target physical cell using the frequency information of the physical cell in the virtual cell information.

In this embodiment of the present disclosure, the terminal receives the virtual cell information at the virtual frequency, where the virtual cell information includes the information about the at least one physical cell indicated by the virtual cell; the terminal determines, according to the information about the at least one physical cell, the target physical cell to be pre-accessed; and the terminal accesses the target physical cell using the information about the target physical cell. According to this manner, information about a physical cell is received and transmitted at the virtual frequency, such that an idle virtual frequency resource is fully utilized, and a latency for the terminal to access the target physical cell is reduced.

It can be understood that, for specific implementations of all modules and units of the random access apparatus, reference may be further made to the related descriptions in the method embodiment.

Figure 8:
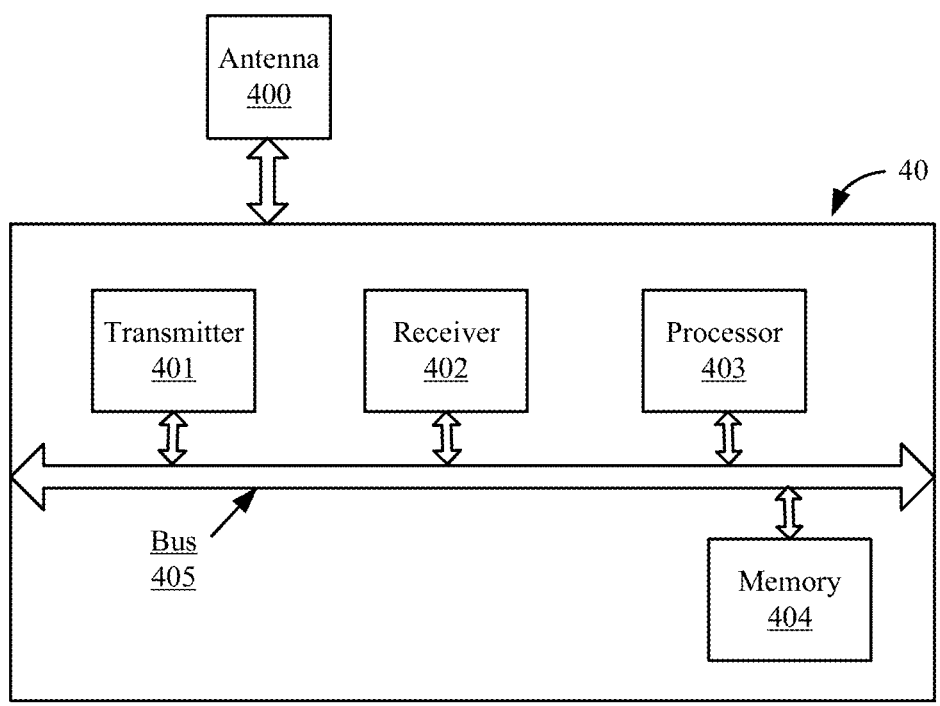
FIG. 8 is a schematic structural diagram of another random access apparatus according to an embodiment of the present disclosure.

Referring to FIG. 8, FIG. 8 is a schematic structural diagram of another random access apparatus according to an embodiment of the present disclosure. As shown in the figure, the random access apparatus in FIG. 8 can be configured to implement the steps and the methods in the method embodiments. In the embodiment in FIG. 8, the random access apparatus 40 includes an antenna 400, a transmitter 401, a receiver 402, a processor 404, and a memory 404. The processor 404 controls an operation of the random access apparatus 40, and may be configured to process a signal. The memory 404 may include a read-only memory and a random access memory, and provides an instruction and data to the processor 403. The transmitter 401 and the receiver 402 may be coupled to the antenna 400, and components of the access site 40 are coupled together using a bus system 405. In addition to a data bus, the bus system 405 includes a power bus, a control bus, and a status signal bus. However, for clear description, various kinds of buses in the figure are denoted as the bus system 405. The random access apparatus may be included in a terminal.

The memory 404 may store an instruction for performing the following procedure: receiving, by the terminal, virtual cell information at a virtual frequency, where the virtual cell information includes information about at least one physical cell indicated by the virtual cell; determining, by the terminal according to the information about the at least one physical cell, a target physical cell to be pre-accessed; and accessing, by the terminal, the target physical cell using information about the target physical cell.

Optionally, the virtual cell information is virtual cell system information, the at least one physical cell includes all physical cells in coverage of the virtual cell, and the information about the physical cell includes random access information of the physical cell, or includes capability information and random access information of the physical cell.

The capability information includes one or more of the following information: load information, a multiconnection capability, a MIMO capability, MBMS service support, MDT, a D2D capability, a new carrier type, or extended carrier support of the physical cell.

In an optional implementation, if the information about the physical cell includes the capability information and the random access information of the physical cell, before the determining, by the terminal according to the information about the at least one physical cell, a target physical cell to be pre-accessed, the procedure further includes searching, by the terminal, for at least one candidate physical cell in which the terminal is currently located; the determining, by the terminal according to the information about the at least one physical cell, a target physical cell to be pre-accessed includes obtaining, by the terminal, capability information of each of the at least one candidate physical cell from the virtual cell system information, and selecting, by the terminal according to the capability information of each candidate physical cell, a physical cell that matches a capability or a service characteristic of the terminal; and determining the physical cell that matches the capability or the service characteristic of the terminal as the target physical cell to be pre-accessed; and the accessing, by the terminal, the target physical cell using information about the target physical cell includes reading, by the terminal, random access information of the target physical cell from the virtual cell system information, and accessing the target physical cell using the random access information of the target physical cell.

Optionally, the virtual cell system information is sent over a PBCH and a BCH of the virtual cell.

In another optional implementation, before the receiving, by the terminal, virtual cell information at a virtual frequency, the procedure further includes sending, by the terminal, a random access request to the virtual cell at the virtual frequency, so as to trigger the virtual cell to indicate, according to the random access request, information about a physical cell to the terminal using the virtual cell information, where the information about the physical cell is frequency information of the physical cell, and the frequency information of the physical cell includes an UL frequency and a DL frequency of the physical cell; the determining, by the terminal according to the information about the at least one physical cell, a target physical cell to be pre-accessed includes determining, by the terminal, the physical cell indicated in the virtual cell information as the target physical cell to be pre-accessed; and the accessing, by the terminal, the target physical cell using information about the target physical cell includes accessing, by the terminal, the target physical cell using the frequency information of the physical cell in the virtual cell information.

Optionally, the physical cell in the virtual cell information is a physical cell corresponding to a micro base station, satisfying a preset criterion, selected from at least one micro base station that receives the random access request.

The preset criterion includes that received signal quality satisfies a preset threshold; and if received signal quality of multiple micro base stations satisfies the preset threshold, a micro base station that has minimum load is selected.

In this embodiment of the present disclosure, the terminal receives the virtual cell information at the virtual frequency, where the virtual cell information includes the information about the at least one physical cell indicated by the virtual cell; the terminal determines, according to the information about the at least one physical cell, the target physical cell to be pre-accessed; and the terminal accesses the target physical cell using the information about the target physical cell. According to this manner, information about a physical cell is received and transmitted at the virtual frequency, such that an idle virtual frequency resource is fully utilized, and a latency for the terminal to access the target physical cell is reduced.

A person of ordinary skill in the art may understand that all or some of the procedures of the methods in the embodiments may be implemented by a computer program instructing relevant hardware. The program may be stored in a computer readable storage medium. When the program runs, the procedures of the methods in the embodiments are performed. The foregoing storage medium may include a magnetic disk, an optical disc, a read-only memory (ROM), or a random access memory (RAM).

A sequence of the steps of the method in the embodiments of the present disclosure may be adjusted, and certain steps may also be merged or removed according to an actual need.

Modules of the random access apparatus in this embodiment of the present disclosure may be combined, divided, and omitted according to an actual need.

Units of the random access apparatus in this embodiment of the present disclosure may be combined, divided, and omitted according to an actual need.

Components such as a micro-controller in this embodiment of the present disclosure may be implemented as a universal integrated circuit, such as a central processing unit (CPU), or an application-specific integrated circuit (ASIC).

What is disclosed above is merely specific embodiments of the present disclosure, and certainly is not intended to limit the protection scope of the present disclosure. Therefore, equivalent variations made in accordance with the claims of the present disclosure shall fall within the scope of the present disclosure.

What is claimed is:

1. A random access method, comprising:
  receiving, by a terminal, virtual cell information at a virtual frequency that is only used for control signaling and that is not used for data transfer, wherein the virtual cell information comprises information about at least one physical cell corresponding to a virtual cell, and wherein the information about the at least one physical cell comprises random access information and capability information of the at least one physical cell;
  searching, by the terminal, for one or more candidate physical cell of the at least one physical cell in which the terminal is currently located;
  obtaining, by the terminal, capability information of each candidate physical cell;
  selecting, by the terminal according to the capability information of each candidate physical cell, a physical cell that matches a capability of the terminal, wherein the capability information comprises one or more of a multiconnection capability, a multiple-input multiple-output (MIMO) capability, multimedia broadcast multicast service (MBMS) service support, minimization of drive tests support (MDT), a new carrier type, or extended carrier support of the physical cell;
  determining the physical cell matching the capability of the terminal as a target physical cell to be pre-accessed; and
  accessing, by the terminal, the target physical cell using information about the target physical cell.

2. The random access method of claim 1, wherein the virtual cell information is virtual cell system information, and wherein the at least one physical cell comprises all physical cells in coverage of the virtual cell.

3. The random access method of claim 2,
wherein accessing, by the terminal, the target physical cell using information about the target physical cell comprises:
reading, by the terminal, random access information of the target physical cell from the virtual cell system information; and
accessing the target physical cell using the random access information of the target physical cell.

4. The random access method of claim 2, wherein the virtual cell system information is sent over a physical broadcast channel (PBCH) and a bearer broadcast channel (BCH) of the virtual cell.

5. The random access method of claim 1, wherein before receiving, by the terminal, the virtual cell information at the virtual frequency, the method further comprises sending, by the terminal, a random access request to the virtual cell at the virtual frequency, wherein the information about the at least one physical cell indicates that a first physical cell is to be used and includes frequency information of the first physical cell, wherein the frequency information of the first physical cell comprises an uplink frequency and a downlink frequency of the first physical cell, wherein determining, by the terminal according to the information about the at least one physical cell, the target physical cell to be pre-accessed comprises determining, by the terminal, the first physical cell as the target physical cell to be pre-accessed based on the information about the at least one physical cell indicating that the first physical cell is to be used, and wherein accessing, by the terminal, the target physical cell using information about the target physical cell comprises accessing, by the terminal, the target physical cell using the frequency information of the first physical cell indicated in the virtual cell information.

6. The random access method of claim 5, wherein the physical cell indicated in the virtual cell information is a physical cell corresponding to a micro base station that satisfies a preset criterion, wherein the physical cell is selected from at least one micro base station that receives the random access request, wherein the preset criterion comprises that received signal quality satisfies a preset threshold, and wherein a micro base station that has minimum load is selected when a received signal quality of multiple micro base stations satisfies the preset threshold.

7. The random access method of claim 1, wherein the virtual cell is a virtual macrocell that carries only control signaling and includes a main transmit point that performs radio resource control protocol (RRC) link maintenance, and wherein the virtual cell information is received from the main transmit point.

8. The random access method of claim 1, wherein the virtual cell corresponds to multiple physical cells that are served by respective micro base stations, and wherein the virtual cell information is received from one of the respective micro base stations.

9. A random access apparatus, comprising:
a receiver configured to receive virtual cell information at a virtual frequency that is only used for control signaling and that is not used for data transfer, wherein the virtual cell information comprises information about at least one physical cell corresponding to a virtual cell, and wherein the information about the at least one physical cell comprises random access information and capability information of the at least one physical cell; and
a processor coupled to the receiver and configured to:
search for one or more candidate physical cell of the at least one physical cell in which the random access apparatus is currently located;
obtain capability information of each candidate physical cell;
select, according to the capability information of each candidate physical cell, a physical cell that matches a capability of the random access apparatus, wherein the capability information comprises one or more of a multiconnection capability, a multiple-input multiple-output (MIMO) capability, multimedia broadcast multicast service (MBMS) service support, minimization of drive tests support (MDT), a new carrier type, or extended carrier support of the physical cell;
determine the physical cell matching the capability of the random access apparatus as a target physical cell to be pre-accessed; and
access the target physical cell using information about the target physical cell.

10. The random access apparatus of claim 9, wherein the virtual cell information is virtual cell system information, and wherein the at least one physical cell comprises all physical cells in coverage of the virtual cell.

11. The random access apparatus of claim 10, wherein the processor is further configured to:
read random access information of the target physical cell from the virtual cell system information; and
access the target physical cell using the random access information of the target physical cell.

12. The random access apparatus of claim 10, wherein the virtual cell system information is sent over a physical broadcast channel (PBCH) and a bearer broadcast channel (BCH) of the virtual cell.

13. The random access apparatus of claim 9, wherein the apparatus further comprises a transmitter coupled to the processor and configured to send a random access request to the virtual cell at the virtual frequency, wherein the information about the at least one physical cell further includes information indicating that a first physical cell is to be used and includes frequency information of the first physical cell, wherein the frequency information of the first physical cell comprises an uplink frequency and a downlink frequency of the first physical cell, and wherein the processor is further configured to:
determine the first physical cell as the target physical cell to be pre-accessed based on the information about the at least one physical cell indicating the first physical cell is to be used; and
access the target physical cell using the frequency information of the first physical cell in the virtual cell information.

14. The random access apparatus of claim 13, wherein the first physical cell is a physical cell corresponding to a micro base station that satisfies a preset criterion and that is selected from at least one micro base station that receives the random access request, wherein the preset criterion comprises that received signal quality satisfies a preset threshold, and wherein a micro base station that has minimum load is selected when received signal quality of multiple micro base stations satisfies the preset threshold.

15. The random access apparatus of claim 9, wherein the virtual cell includes a main transmit point that performs radio resource control protocol (RRC) link maintenance, and wherein the virtual cell information is received from the main transmit point.

16. The random access apparatus of claim 9, wherein the virtual cell corresponds to multiple physical cells that are served by respective micro base stations, and wherein the virtual cell information is received from one of the respective micro base stations.

17. A random access apparatus comprising a processor readable storage medium storing instructions that, when executed by a processor, cause the random access apparatus to:
- receive virtual cell information at a virtual frequency that is only used for control signaling and that is not used for data transfer, wherein the virtual cell information comprises information about at least one physical cell corresponding to a virtual cell, and wherein the information about the at least one physical cell comprises random access information and capability information of the at least one physical cell;
- search for one or more candidate physical cell of at least one physical cell in which the random access apparatus is currently located;
- obtain capability information of each candidate physical cell;
- select, according to the capability information of each candidate physical cell, a physical cell that matches a capability of the random access apparatus, wherein the capability information comprises one or more of a multiconnection capability, a multiple-input multiple-output (MIMO) capability, multimedia broadcast multicast service (MBMS) service support, minimization of drive tests support (MDT), a new carrier type, or extended carrier support of the physical cell;
- determine the physical cell matching the capability of the random access apparatus as a target physical cell to be pre-accessed; and
- access the target physical cell using information about the target physical cell.

18. The random access apparatus of claim 17, wherein the virtual cell information is virtual cell system information, and wherein the at least one physical cell comprises all physical cells in coverage of the virtual cell.

19. The random access apparatus of claim 18, wherein the instructions are further configured to cause the random access apparatus to:
- read random access information of the target physical cell from the virtual cell system information; and
- access the target physical cell using the random access information of the target physical cell.

20. The random access apparatus of claim 18, wherein the virtual cell system information is sent over a physical broadcast channel (PBCH) and a bearer broadcast channel (BCH) of the virtual cell.

* * * * *